(12) United States Patent
Smith (10) Patent No.: US 9,010,013 B2
(45) Date of Patent: Apr. 21, 2015

(54) HUNTING DECOY

(75) Inventor: Drake S. Smith, Fort Smith, AR (US)

(73) Assignee: Sterling Clark Inc., Fort Smith, AR (US)

( * ) Notice: Subject to any disclaimer, the term of this patent is extended or adjusted under 35 U.S.C. 154(b) by 386 days.

(21) Appl. No.: 13/531,176

(22) Filed: Jun. 22, 2012

(65) Prior Publication Data

US 2012/0324777 A1  Dec. 27, 2012

Related U.S. Application Data

(60) Provisional application No. 61/571,297, filed on Jun. 24, 2011.

(51) Int. Cl.
*A01M 31/06* (2006.01)

(52) U.S. Cl.
CPC ..................................... *A01M 31/06* (2013.01)

(58) Field of Classification Search
USPC ......................................................... 43/2, 3
See application file for complete search history.

(56) References Cited

U.S. PATENT DOCUMENTS

| | | | | |
|---|---|---|---|---|
| 1,376,282 A * | 4/1921 | Kauffman | | 43/2 |
| 2,237,897 A * | 4/1941 | Vos | | 446/388 |
| 4,821,444 A * | 4/1989 | Remus | | 43/2 |
| 5,797,208 A * | 8/1998 | Lessa | | 43/2 |
| 5,832,649 A * | 11/1998 | Kilgore | | 43/2 |
| 6,385,895 B1 * | 5/2002 | Scaries | | 43/2 |
| 6,655,071 B2 * | 12/2003 | Barnes et al. | | 43/3 |
| 6,807,765 B2 * | 10/2004 | Watermann | | 43/2 |
| 6,907,688 B2 * | 6/2005 | Brint | | 43/2 |
| 6,925,745 B1 * | 8/2005 | Alessi | | 43/1 |
| 7,137,221 B2 * | 11/2006 | Highby et al. | | 43/2 |
| 7,389,606 B2 * | 6/2008 | McLeod | | 43/2 |
| 8,484,883 B2 * | 7/2013 | Rogers | | 43/2 |

\* cited by examiner

*Primary Examiner* — Christopher P Ellis
(74) *Attorney, Agent, or Firm* — Boyd D. Cox (57) ABSTRACT

A hunting decoy that simulates a life-sized herd of deer includes a decoy image element that is supported during use by a support system having a central suspension support and peripheral stabilizing supports. Both the support system and the decoy image element can be collapsed for transport and storage.

16 Claims, 10 Drawing Sheets

HUNTING DECOY

Priority for this application is claimed from U.S. Provisional Application No. 61/571,297 entitled "Hunting Decoy" filed on Jun. 24, 2011

BACKGROUND

The present invention is directed to a hunting decoy that simulates a life-sized herd of animals, such as deer. The decoy can be quickly set up for use and readily disassembled for storage. When disassembled, the decoy can be stored in a carrying pouch such as a bag for easy transport.

When hunting game, it is advantageous to have a decoy that simulates the particular game animal sought. A decoy can attract game animals to the area where the decoy is located. Consequently, hunters or wildlife observers can increase the possibility of encountering the sought after game animal by having a decoy positioned nearby.

Most decoys are full sized models of the simulated animal, generally made from plastic or foam. The larger the animal, the more cumbersome it is to transport a life-sized decoy to the desired location. In addition to transporting, the decoys are often difficult to secure in place without falling over. The life-sized decoys molded from plastic tend to be rigid and immovable, thus lacking any life-like movement. Such lack of movement can be a danger alert to the sought after animal and actually drive the animal farther from the desired location.

In addition, the details of the animal's appearance are usually painted on the decoys shown in the prior art. This can diminish the decoy's life-like look and instead create a cartoon-like effect on the decoy. Animals, such as deer and elk, having high visual acuity can more easily discern the image as being a decoy rather than a live animal and consequently avoid coming close to the decoy.

The present invention is a hunting decoy for attracting game animals that is lightweight and easily transported, so that it can be carried into remote locations and set up quickly. The decoy simulates a herd of animals, not just a single animal, which provides an enhanced attraction for the game animal. The decoy includes life-sized photographic animal images on the exposed surfaces which can shimmer and move in the breeze to simulate live animals grazing.

SUMMARY

The present invention is a hunting decoy having a decoy image element comprising a body with a photo image of a plurality of deer. The decoy image element is held in place by a support system which includes a central suspension support and a plurality of peripheral stabilizing supports. The central suspension support, peripheral stabilizing supports and decoy image element can be collapsed for storage and transport.

It is an object of the present invention to provide a hunting decoy for attracting a game animal.

It is a further object of the present invention to provide a hunting decoy for attracting deer.

It is a further object of the present invention to provide a hunting decoy that simulates a herd of deer.

It is a further object of the present invention to provide a lightweight and easily transported hunting decoy for attracting deer.

It is a further object of the present invention to provide a collapsible hunting decoy that can be erected and broken down quickly and easily.

It is a further object of the present invention to provide a life-sized hunting decoy that can be collapsed into a smaller size for transport and storage.

BRIEF DESCRIPTION OF THE DRAWINGS

Reference is made to the accompanying drawings in which are shown illustrative embodiments of the invention and from which novel features and advantages will be apparent.

DETAILED DESCRIPTION

Figure 1:
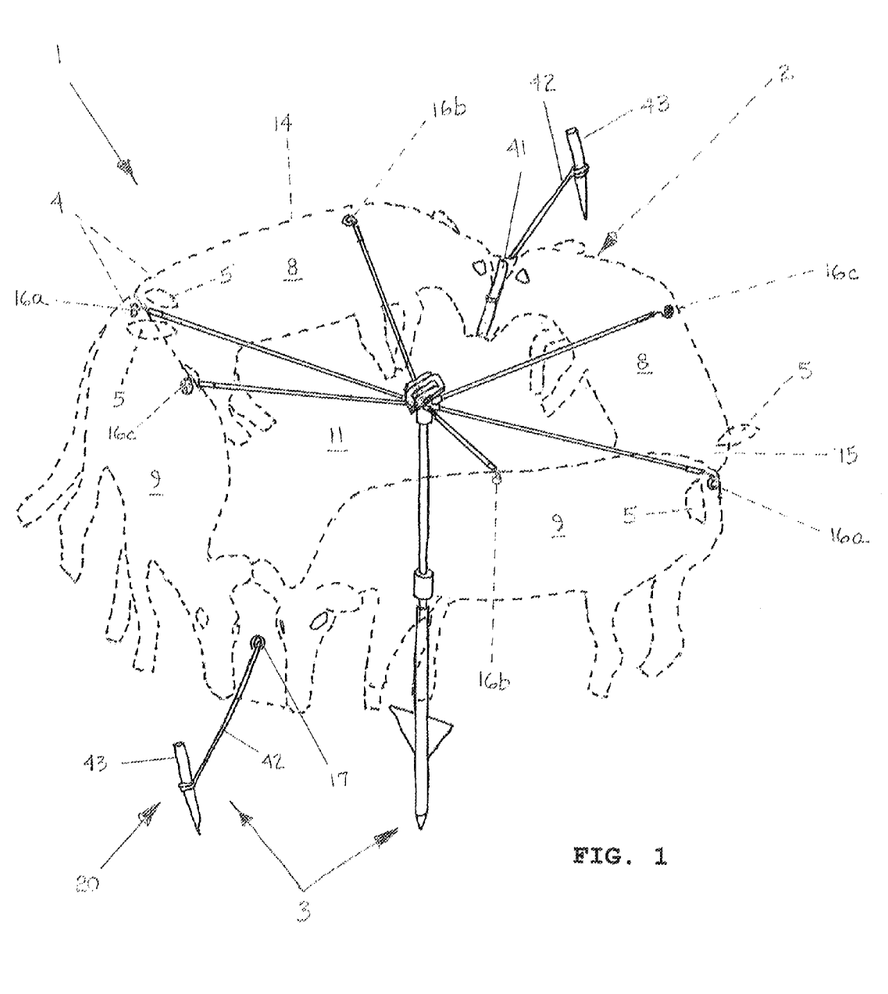
FIG. 1 is a perspective view of a preferred embodiment of the hunting decoy of the present invention in the in-use configuration. The decoy image element is shown in dotted lines and the support system is shown in solid lines with a first embodiment of the central suspension support.
Figure 2:
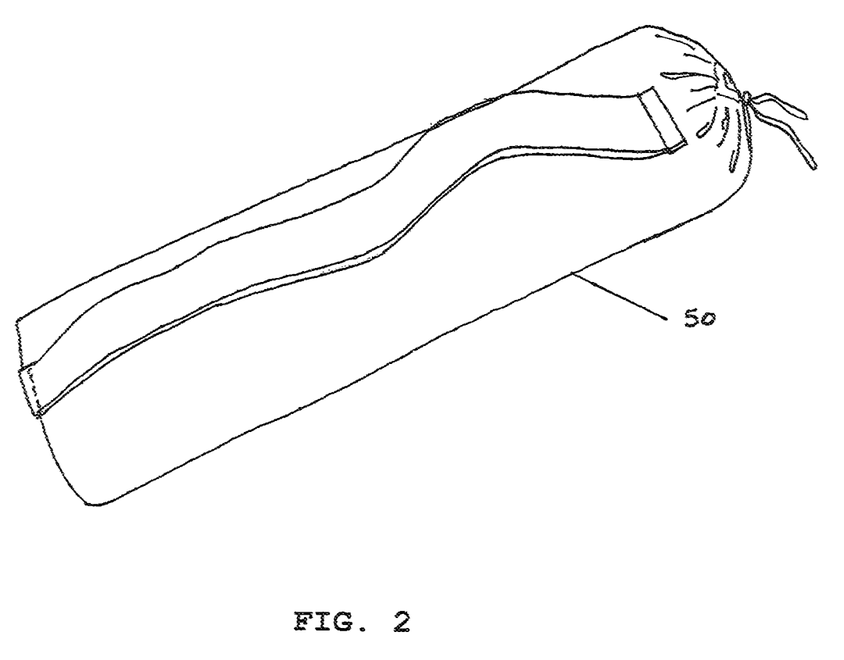
FIG. 2 is a perspective view of a carrying pouch for storing the hunting decoy of FIG. 1.

A preferred embodiment of the hunting decoy (1) of the present invention comprises a decoy image element (2), a support system (3) for the decoy image element (2) and a carrying pouch (50) as shown in FIGS. 1 and 2. The decoy image element (2) includes a body (4), a plurality of tails (5) and support engaging means.

The support system (3) includes primary and secondary supporting means wherein the primary supporting means includes a central suspension support (19,301) and the secondary supporting means includes a plurality of peripheral stabilizing supports (20).

Figure 3:
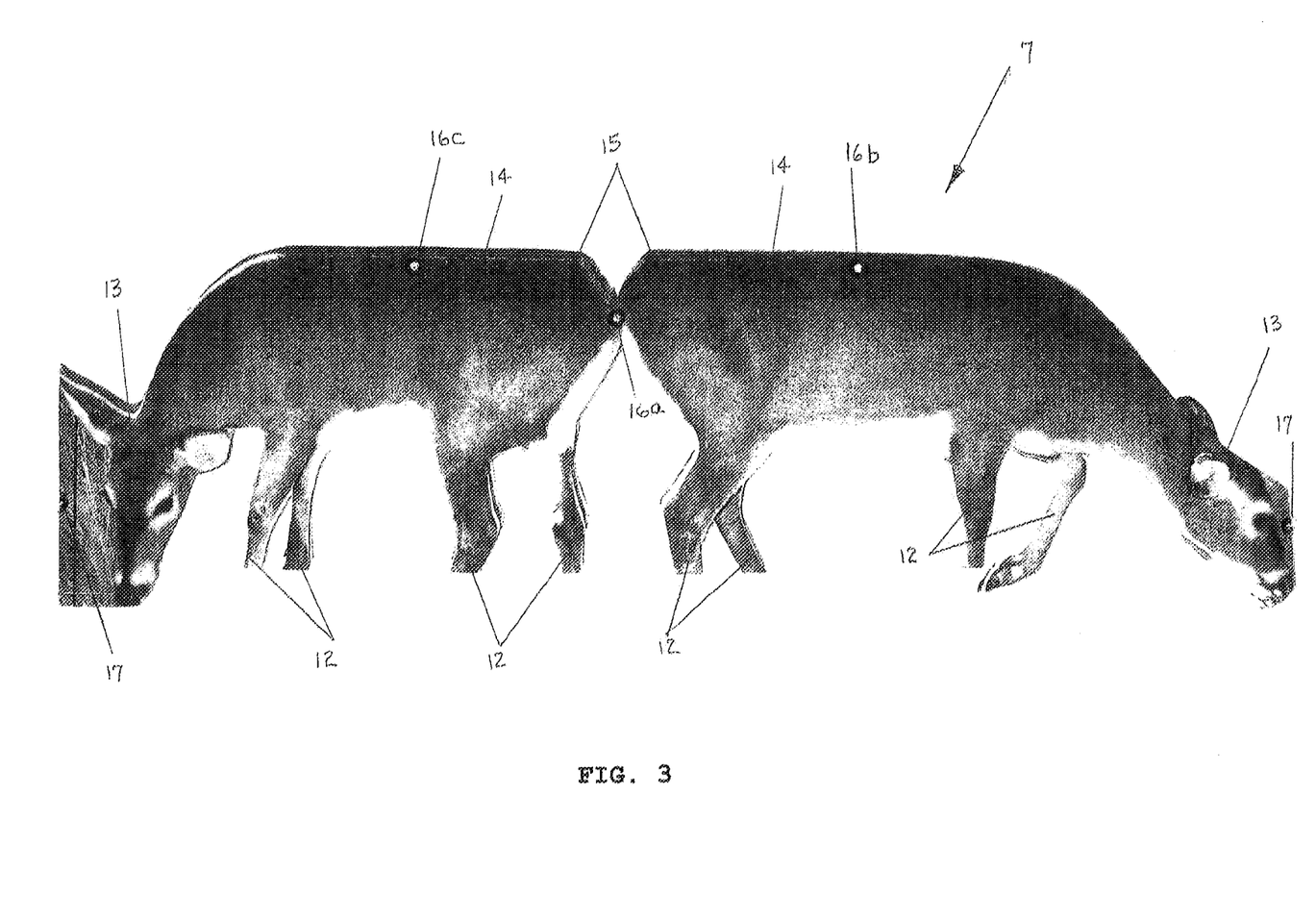
FIG. 3 is a planar side view of two animal images comprised by the body of the hunting decoy of FIG. 1.
Figure 7:
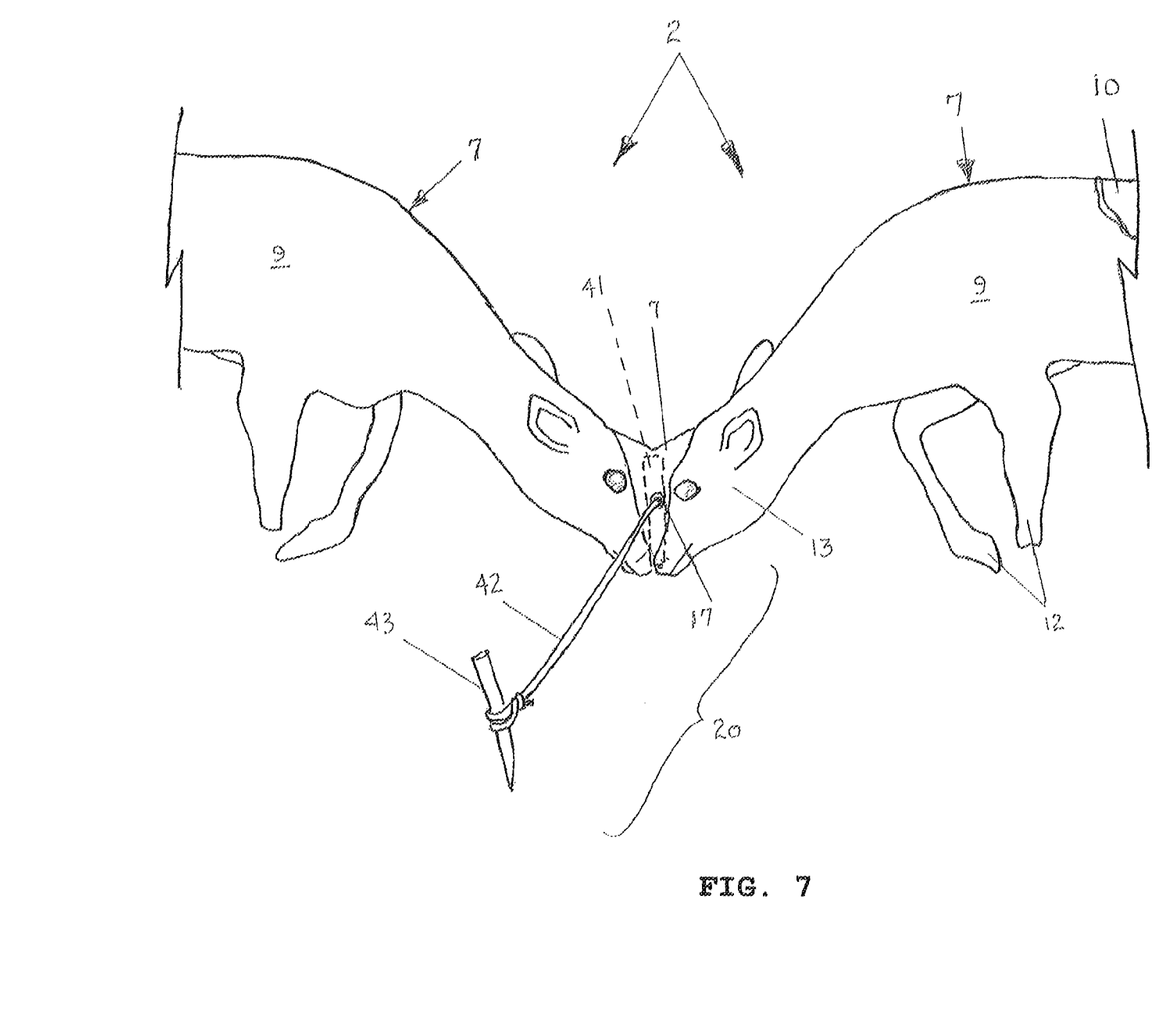
FIG. 7 is a partial side view of the hunting decoy of FIG. 1 in the in-use position showing two heads of the animal images and one of the peripheral stabilizing supports.
Figure 8:
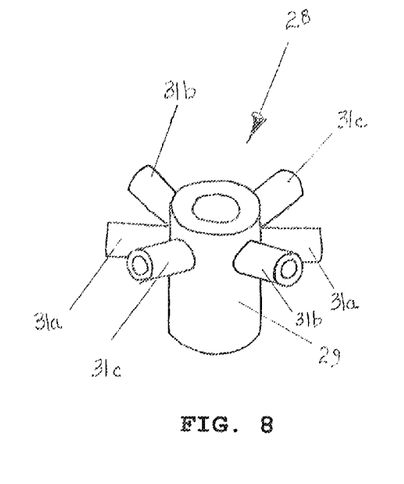
FIG. 8 is a perspective view of the arm supporting collar of the central suspension support of FIG. 1.
Figure 9:
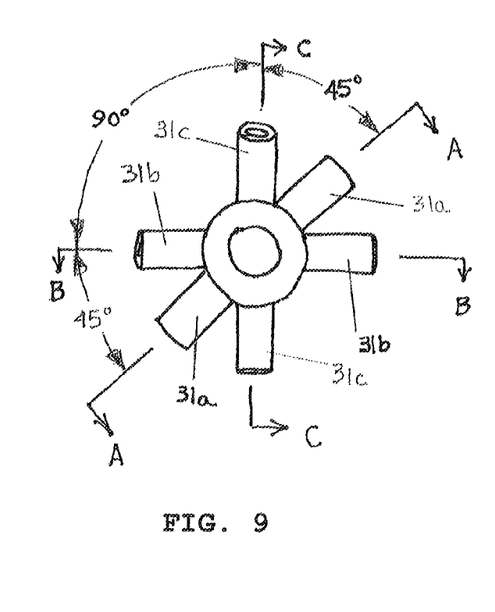
FIG. 9 is a top view of the arm supporting collar of the central suspension support of FIG. 1.
Figure 10A:
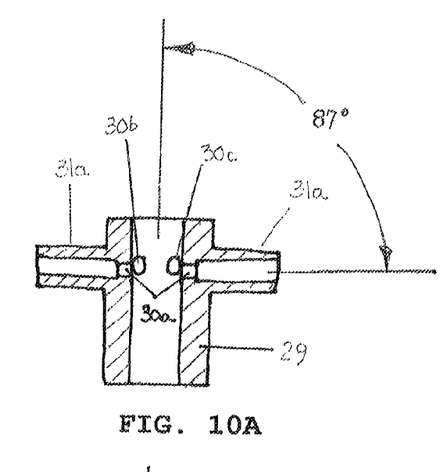
FIG. 10A is a cross sectional view of the arm supporting collar taken along line A-A in FIG. 9.
Figure 10B:
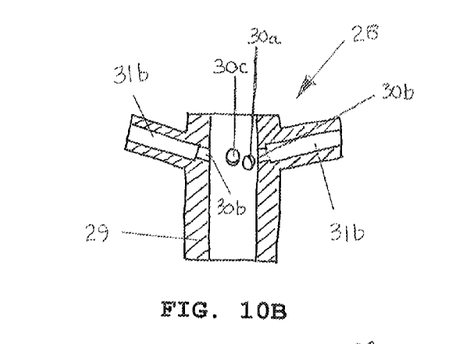
FIG. 10B is a cross sectional view of the arm supporting collar taken along line B-B in FIG. 9.
Figure 10C:
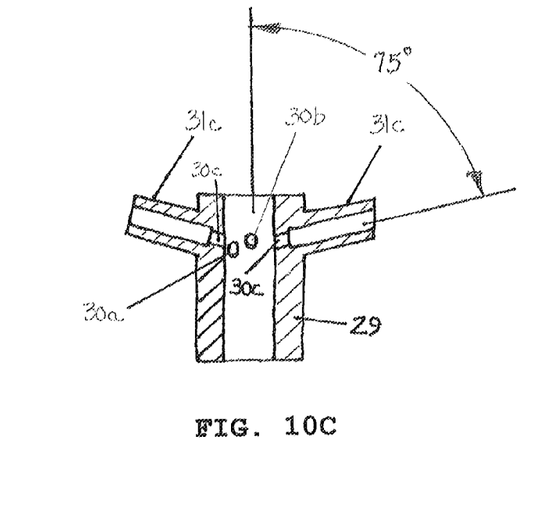
FIG. 10C is a cross sectional view of the arm supporting collar taken along line C-C in FIG. 9.

Referring to FIGS. 1, 3 and 7, the body (4) of the decoy image element (2) includes an image of a group of deer, each deer being an animal image (7) having legs (12), a head (13), a back (14) and a rear (15). The image is preferably a life-like, photographic image. The body (4) also includes an interior side (8) with an interior surface and an exterior side (9) with an exterior surface. A foam core (10) is disposed between the interior (8) and exterior (9) sides of the body (4).

The support engaging means on the decoy image element (2) comprises a plurality of first (16a,16b,16c) and second (17) apertures.

Figure 4:
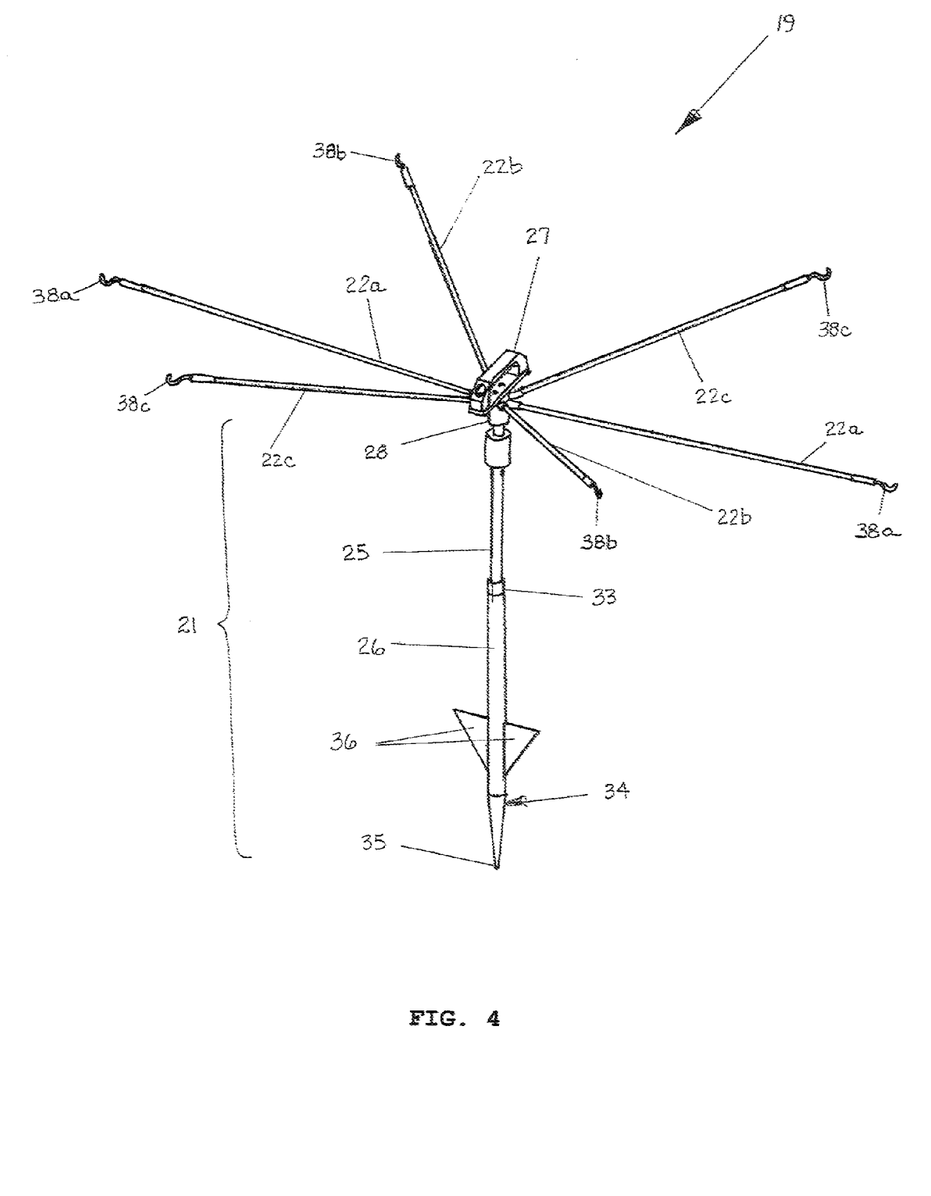
FIG. 4 is a perspective view of a first embodiment of the central suspension support of the hunting decoy of shown in FIG. 1 deployed in the extended position.
Figure 5:
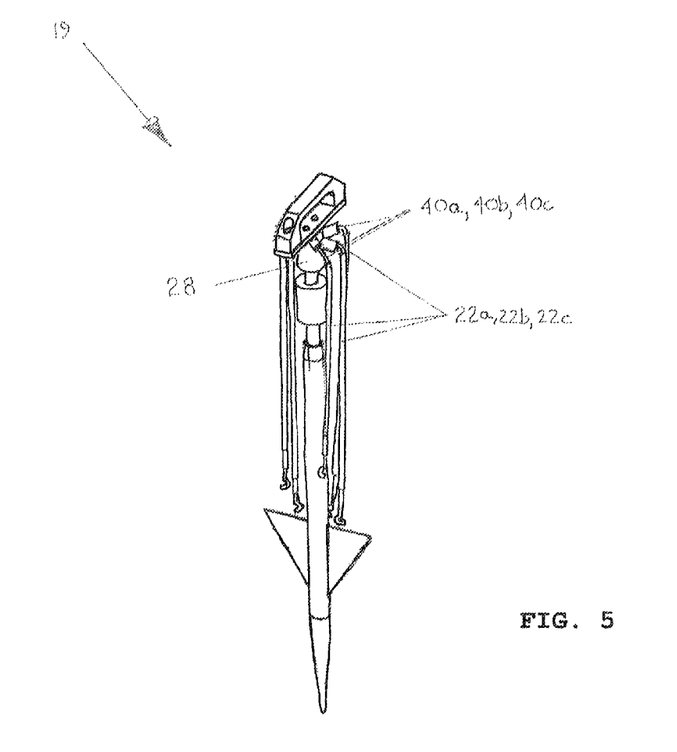
FIG. 5 is a perspective view of a first embodiment of the central suspension support of the hunting decoy of FIG. 1 in the collapsed position.
Figure 6:
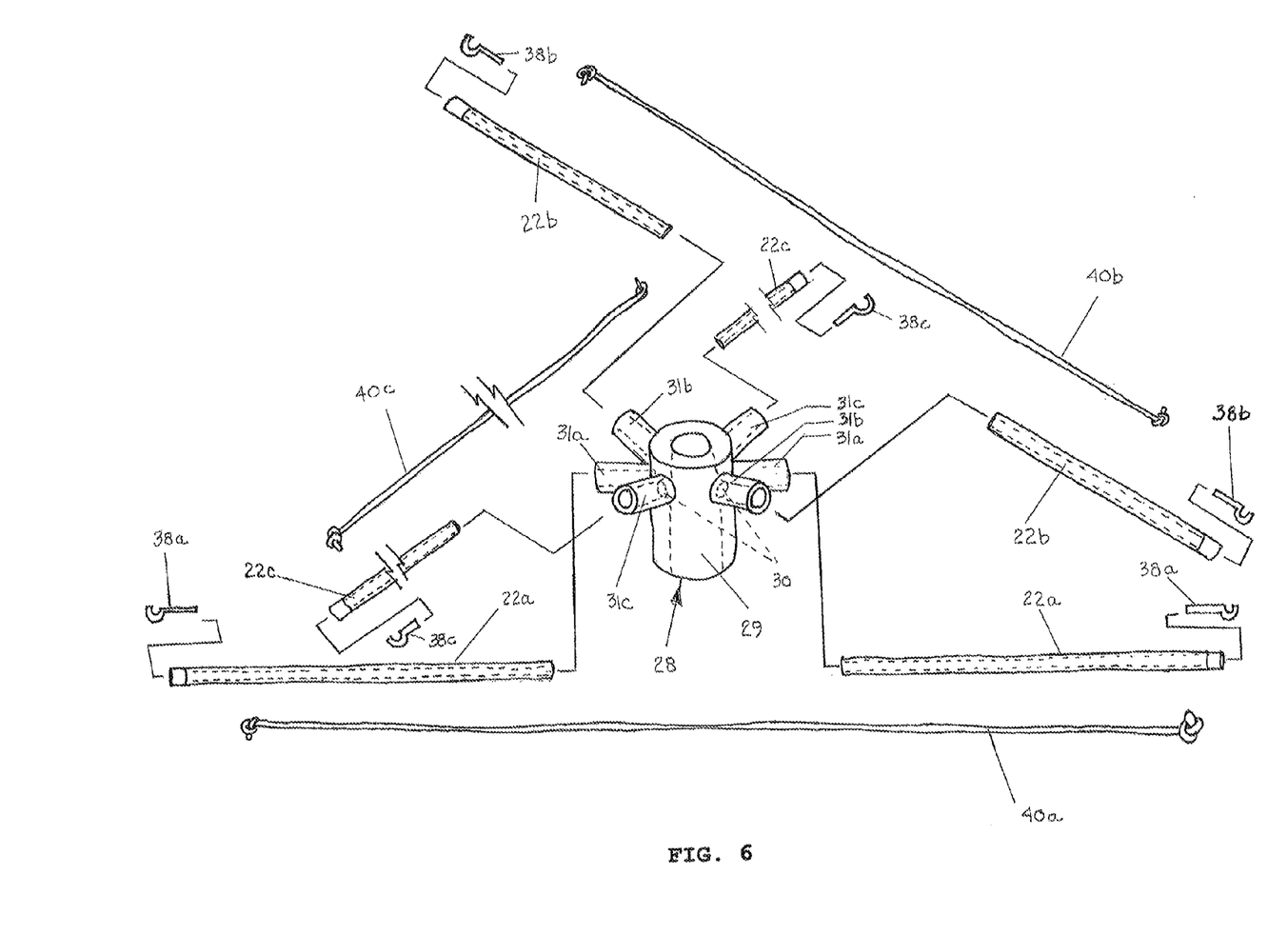
FIG. 6 is an exploded view of the arm supporting collar, the support arms, the elastic restraining cord and the swivel hooks comprised by the first embodiment of the central suspension support of the hunting decoy of FIG. 1.

A first embodiment of the central suspension support (19) shown in FIGS. 4-6 includes a stanchion (21) having a plurality of telescoping members (25,26) and means for locking the telescoping members in adjustable positions. The central suspension support (19) further comprises a plurality of support arms (22a,22b,22c) and means for extending and collapsing the support arms. The means for extending and collapsing the support arms is a releasable arms support (44). The releasable arms support (44) includes an arm supporting collar (28), a plurality of arm fittings (31) and means for tensioning the support arms on the stanchion. The means for tensioning the support arms on the stanchion comprises a plurality of elastic retaining cords (40a,40b,40c).

The telescoping members (25,26) include upper (25) and lower (26) elongated members. The central suspension support (19) also includes a handle (27) that is disposed on an upper end of the upper elongated member (25).

The arm supporting collar (28) comprises a central tube (29) with a plurality of tube apertures (30a,30b,30c) disposed around the arm supporting collar (28) as shown in FIGS. 8, 9 and 10A-10C. The arm fittings (31a,31b,31c) comprising sleeves are also disposed around the arm supporting collar (28).

Shown in FIGS. 4 and 5, the lower elongated member (26) has a ground engaging portion (34) with a pointed tip (35) disposed on a distal end thereof and an insertion device (36) for pushing the pointed tip (35) into the ground. The insertion device (36) is a foot pedal.

In the first embodiment of the central suspension support (19), each of the support arms (22a,22b,22c) includes a proximal end and a distal end. Each of the distal ends has body engaging means. The body engaging means comprises a respective swivel hook (38a,38b,38c) mounted on each support arm's distal end.

The central suspension support (19) includes a collapsed position as shown in FIG. 5 with the support arms (22) disposed downwardly adjacent to the stanchion (21) and an extended position as shown in FIG. 4 with the support arms (22) extending radially outwardly from the stanchion (21).

Furthermore, the hunting decoy (1) includes an in-use configuration and a storage configuration. In the storage configuration, the decoy image element (2) is detached from the central suspension support (19), the support arms (22) are in the collapsed position, and the peripheral stabilizing supports (20) are not deployed. In the in-use configuration, the support arms (22) are in the extended position, the decoy image element (2) is attached to the central suspension support (19) and the peripheral stabilizing supports (20) are deployed.

The peripheral stabilizing supports (20) are shown to each include a stiffening rod (41), a stabilizing cord (42) and a stake (43).

The decoy image element (2) is a continuous loop formed by a series of the animal images (7). The decoy image element (2) is defined by the exterior (9) and interior (8) sides which are shaped and colored to resemble a herd of life-sized deer. When the hunting decoy (1) is disposed in the in-use configuration, the continuous loop is spread open to exhibit an expanded diameter. The surface of the interior side (8) is spaced apart, creating a centralized open area (11) surrounded by the continuous loop of the decoy image element (2).

Preferably, the centralized open area (11) is substantially in the shape of a diamond. The body (4) of the decoy image element (2) is shaped to resemble the profile of a plurality of deer as shown in FIG. 3. Two of the animal images (7) have a full body and head profile and the other two images (7) have a full body profile and a partial frontal view of the head. The photographic image is on both the exterior and the interior surfaces. The legs (12) on the body (4) of the decoy image element (2) are cutout with the hooves removed from the animal images (7). Although it is preferred that the centralized open area (11) be substantially in the shape of a diamond, the shape could vary to include any other geometric configuration. Also, in an alternative embodiment, the number of images of the deer comprising the body could vary.

Each of the tails (5) is three dimensional, formed of bristly fur-like material, and attached to the rear (15) of the animal image (7). The material simulates an actual deer tail in form and color.

The body (4) having the animal image (7) of the deer is made of a pliant, polyduct material. In a preferred embodiment, the photo images are digital and are printed onto the polyduct material or transferred thereto by other suitable methods. Disposed between the interior (8) and exterior (9) sides of the body (4), the foam core (10) comprises at least one foam layer of ethylene-vinyl acetate (EVA). The layer is preferably about 2 mm in thickness. Although EVA is the preferred material for the foam core, other suitable materials could be used instead.

The stanchion (21) comprises at least an upper (25) and lower (26) elongated member. Additional elongated members could be added to increase the length of the stanchion (21), if desired.

The decoy image element (2) is highly visible from a distance and acts primarily to attract the attention of nearby deer and lure them toward the hunting decoy (1). The realistic image and positioning of the deer in the decoy image element (2) give the appearance of a herd of deer grazing. The tail (5) is three-dimensional and can move independently of the body (4) lending a realistic character to the decoy image element (2).

The foam core (10) provides a pliant, stiffening means for the body (4), such that the body (4) can bend and wave slightly in a breeze while still retaining an upright disposition. The polyduct material forming the interior (8) and exterior (9) sides allows the respective surfaces to shimmer when shaken, as often caused by breezes. The resulting "shimmer" creates a movement on the surfaces of the body (4) that simulates the real-life movement of deer. Since deer are highly visual animals, the simulated, real-life movement of the decoy's body (4) can be reassuring to a wary deer, indicating that the area near the decoy is a safe one.

Adding to the visual aspects of the decoy image element (2), each of the tails (5) can move independently from the interior (8) and exterior (9) sides of the body (4) and also can move independently from each other. Consequently, the sides (8) can shimmer and the tails (5) can wave in the same breeze. With all of these parts moving in a different manner, the hunting decoy (1) can simulate the actual movements of live deer in the field.

The support system (3) for the decoy image element (2) holds the decoy image element (2) in an expanded, upright position, thereby offering a clear and realistic viewing of the animal images (7) on the body (4) from afar. Specifically, the central suspension support (19) holds the body (4) of the decoy image element (2) in a suspended position, thereby allowing the sides (8,9) of the body (4) to move and shimmer. In addition, the legs (12) on the suspended body (4) hang freely and therefore are also allowed to move in response to a breeze in order to create life-like movement of the hunting decoy (1).

The secondary supporting means comprises peripheral stabilizing supports (20) that anchor the body (4) to the ground. The peripheral stabilizing supports (20) are disposed at various points around the continuous loop formed by the body (4) and hold the body (4) in an open, expanded position when the hunting decoy (1) is in the in-use configuration.

On the lower elongated member (26), the pointed tip (35) and insertion device (36) facilitate insertion of the stanchion (21) into the ground. The insertion device (36) is preferably a foot pedal having a pair of blades on the lower elongated member (26). The handle (27) can be used for carrying the hunting decoy (1) and also for removing the stanchion (21) from the ground. With the pointed tip (35) and insertion device (36), the lower telescoping section (26) can be readily installed and removed. The swivel hooks (38a,38b,38c) on each of the respective support arms (22a,22b,22c) engage and suspend the decoy image element (2) from the central suspension support (19).

In the first embodiment of the central suspension support (19), the support arms (22a,22b,22c) are removably attached to the stanchion (21) and the swivel hooks (38a,38b,38c) are movably attached to respective support arms (22a,22b,22c). The support arms (22a,22b,22c) can be moved into different positions relative to the stanchion (21). These positions depend on the selected position of the central suspension support (19). The arm supporting collar (28) is fitted onto an upper end of the stanchion (21). The proximal end of each support arm (22a,22b,22c) can be alternately attached to and detached from a respective arm fitting (31a,31b,31c) such that one of the support arms (22a,22b,22c) is disposed on one of the respective fittings (31a,31b,31c). Each of the arm fittings (31a,31b,31c) extends radially from the central tube (29) of the arm supporting collar (28). The collar (28) includes at last three pairs of arm fittings (31a,31b,31c) with the fittings (31a,31b,31c) of each pair being generally aligned in a co-linear arrangement on the collar's central tube (29). Additionally, each arm fitting (31a,31b,31c) is tubular with a hollow interior that is coextensive with a respective tube aperture (30a,30b,30c). The tubular sleeves of the arm fittings (31a,31b,31c) extend radially from the arm supporting collar (28). Each support arm (22a,22b,22c) includes a proximal end that can be removably supported within a respective arm fitting (31a,31b,31c) and a distal end that supports a respective swivel hook (38a,38b,38c) thereon. Consequently, the support arms (22a,22b,22c) also extend radially outwardly from the collar (28) when secured to the arm fittings (31a,31b,31c). Each of the elastic retaining cords (40a,40b,40c) extends through a pair of respective support arms (22a,22b,22c), a pair of respective arm fittings (31a,31b,31c) and a pair of respective tube apertures (30a,30b,30c).

The means for retaining the support arms in position on the stanchion comprises a plurality of elastic retaining cords (40a,40b,40c) as shown in FIGS. 4-6. The elastic retaining cords (40a,40b,40c) assist in holding the respective support arms (22a,22b,22c) on the stanchion (21) in both an extended position (FIG. 4) and a collapsed position (FIG. 5). When the support arms (22) are in the extended position, the proximal end of each support arm (22) is secured to a respective arm fitting (31) and the elastic retaining cords (40a,40b,40c) are tensioned to hold the support arms (22a,22b,22c) in a radial disposition extending outwardly from the arm supporting collar (28). In the collapsed position, each of the support arms (22a,22b,22c) is removed from the arm fittings (31a,31b,31c) of the arm supporting collar (28). However, the support arms (22a,22b,22c) remain tethered to the upper elongated member (25) by a respective elastic retaining cord (401b,40c), such that the support arms (22a,22b,22c) can be disposed generally parallel and adjacent to the stanchion (21) for compact storage.

In the in-use configuration as shown in FIG. 1, the decoy image element (2) is attached to the support system (3). The stanchion (21) can be extended to a desired length. In the extended position, each of the support arms (22a,22b,22c) is positioned in a respective arm fitting (31a,31b,31c) on the arm supporting collar (28) of the stanchion's upper elongated member (25) and the support arms (22) project radially outward from the collar (28).

Referring to FIG. 6, in the first embodiment of the central suspension support (19), the elastic retaining cords (40a,40b,40c) extend through the hollow support arms (22a,22b,22b), the arm fittings (31a,31b,31c), the tube apertures (30a,30b,30c) and the central tube (29) of the collar (28). Each elastic retaining cord (40a,40b,40c) extends through a respective pair of opposing support arms (22a,22b,22c), the two respective arm fittings (31a,31b,31c), the two respective tube apertures (30a,30b,30c) and the central tube (29).

Specifically, one of the elastic retaining cords (40a) extends through both of the respective support arms (22a), both of the respective arm fittings (31a), both of the respective tube apertures (30a) and the central tube (29). Similarly, another elastic retaining cord (40b) extends through both of the respective support arms (22b), both of the respective arm fittings (32b), both of the respective tube apertures (30b) and the central tube (29). The remaining elastic retaining cord (40c) extends through both of the respective support arms (22c), both of the respective arm fittings (32c), both of the respective tube apertures (30c) and the central tube (29).

Each of the arm fittings (31a,31b,31c) extends outwardly from the central tube (29) forming a respective angle between each of the fittings (31a,31b,31c) and the longitudinal axis of the central tube (29). Each of the two support arms (22a) form an angle with the tube's longitudinal axis ranging in magnitude from approximately 85 to 90 degrees and preferably about 87 degrees. Each of the four remaining support arms (22b,22c) forms an angle with the longitudinal axis of the central tube (29) of approximately 72 to 77 degrees and preferably about 75 degrees. Due to the angular disposition of the arm fittings (31a,31b,31c), when the support arms (22a, 22b,22c) are mounted on the respective arm fittings (31a,31b, 31c), a magnitude of the angle between the longitudinal axis of the central tube (29) and each support arm (22a,22b,22c) is approximately the same angular magnitude as that between the respective arm fittings (31a,31b,31c) and the central tube's longitudinal axis.

On the stanchion (21), the handle (27) is disposed atop the arm supporting collar (28). The handle (27) can be used for grasping and pulling the central suspension support (19) to facilitate its removal from the ground. The handle (27) is also convenient for holding and placing the stanchion (21) where needed.

The end of each elastic retaining cord (40a,40b,40c) is anchored at the distal end of the respective support arm (22a, 22b,22c) that is holding the particular elastic retaining cord (40a,40b,40c) therein. Each of the elastic retaining cords (40a,40b,40c) is maintained in tension along its length which helps to hold the support arm (22a,22b,22c) within its respective arm fitting (31a,31b,31c) when the support arms (22a, 22b,22c) of the central suspension support (19) are in the extended position.

When the support arms (22a,22b,22c) are in the collapsed position, the elastic retaining cords (40a,40b,40c) keep the support arms (22a,22b,22c) tethered to the stanchion (21). The elasticity of the retaining cords (40a,40b,40c) allows the support arms (22a,22b,22c) to be placed adjacent to the stanchion (21) for a more compact disposition used during storage and transport.

The three pairs of arm fittings (31a,31b,32c) and tube apertures (30) are disposed along a length of the central tube (29) of the arm supporting collar (28). Each of the respective pairs of arm fittings (31a,31b,31c) and tube apertures (30) are positioned at different lengths along the central tube (29) so that each of the elastic retaining cords (40) held within the fittings (31a,31b,31c) and tube apertures (30) can extend through the collar's central tube (29) without interfering with the other cords (40) disposed in that area.

In the in-use configuration, the decoy image element (2) is supported by the central suspension support (19) as shown in FIG. 1. Each of the first apertures (16a,16b,16c) on the body (4) is engaged with a respective swivel hook (38a,38b,38c) on the support arms (22a,22b,22c).

The peripheral stabilizing supports (20) are also engaged with the decoy image element (2) when the hunting decoy (1) is in the in-use configuration. Each of the stiffening rods (41) is disposed in a respective fold (18) on the continuous loop formed by the body (4). Specifically, a stiffening rod (41) is positioned at each point of the animal image (7) where the heads (13) of the deer meet.

Preferably, the hunting decoy (1) has two peripheral stabilizing supports (20a) and therefore, two stiffening rods (41). The fold (18) is a pocket formed in the body (4) at each of the two aforementioned points for holding the stiffening rods (41) in place. Extending into each fold (18) of the body (4) from the exterior side (9) is a second aperture (17). One end of each stabilizing cord (42) extends through a respective second aperture (17) in the adjacent fold (18) and is attached to a respective stiffening rod (41) that is disposed in the fold (18). The other end of each stabilizing cord (42) is secured to a respective one of the stakes (43) which is inserted into the ground during use.

On the stanchion (21), the upper (25) and lower (26) elongated members are slideably mounted to each other. The locking means is a lock collar (33) that can be tightened to secure the elongated members (25,26) at selected positions relative to each other in order to change the effective length of the stanchion (21). When tightened, the lock collar (33) secures the two elongated members (25,26) together against relative sliding movement. Consequently, to adjust the stanchion (21), the lock collar (33) is loosened, the elongated members (25,26) adjusted to the desired stanchion length and the lock collar (33) tightened, thereby locking the elongated members (25,26) together.

The distal end of each support arm (22a,22b,22c) has a swivel hook (38a,38b,38c) mounted thereon. Each swivel hook (38a,38b,38c) can swivel on its respective support arm (22a,22b,22c). When the support arms (22a,22b,22c) are engaged with the decoy image element (2), each of the first apertures (16a,16b,16c) are disposed on a respective swivel hook (38a,38b,38c).

In the in-use configuration, each of the first apertures (16a) is mounted on a respective one of the swivel hooks (38a). Each of the first apertures (16b) is mounted on a respective one of the swivel hooks (38b) and each of the first apertures (16c) is mounted on one of the respective swivel hooks (38c). The support arms (22a) which engage the first apertures (16a) have a greater length than the other support arms (22b,22c).

On the body (4), the animal images (7) of the deer are approximately life-sized. The EVA foam layer in the decoy image element (2) is preferably about 2 mm in thickness. This provides enough stiffness to hold the decoy image element (2) in the selected position, yet supple enough to allow the decoy image element (2) to move, thereby allowing the sides (8,9) to "shimmer".

The animal images (7) of the body (4) comprise a plurality of deer. The animal images (7) are disposed on both the interior side (8) and the exterior side (9) of the decoy image element (2). The animal images (7) resemble a herd of deer grazing. Two of the images (7) include profiles of the deer's heads (13), while the other two of the images (7) include a partial frontal of the heads (13). All of the bodies of the deer are shown in profile. Each of the legs (12) of animal images (7) is foreshortened by the omission of the lower portion of the legs (12). This enables the decoy image element (2) to be positioned at the height of a standing deer, but without the lower legs of the body (4) contacting the ground. With the lower portion of the legs (12) not contacting the ground, the legs (12) are free to move in response to a breeze for life-like movement.

Preferably, the first apertures (16a,16b,16c) of support engaging means on the decoy image element (2) comprise grommets that are spaced around the continuous loop formed by the body (4). Four of the first apertures (16b,16c) are disposed along an upper boundary on each of the backs (14) of the four deer animal images (7) and are adapted to releasably engage the arm supports (22b,22c) to hold the body (4) in an upright disposition during use. Each of the remaining first apertures (16a) are disposed along the fold (18) at the point of intersection of the rears (15) of the deer animal images (7) and also function to hold the body (4) in an upright position.

The first embodiment of the central suspension support (19) comprises six support arms (22a,22b,22c), six arm fittings (31a,31b,31c), six tube apertures (30a,30b,30c) and three elastic retaining cords (40a,40b,40c). However, the number of arms, fittings and cords could vary in accordance with a user's requirements. The number of first apertures (16) could also vary along with the number of coinciding support arms (22) on the central suspension support (19).

In the animal images (7) of the body (4), the deer in each pair are positioned head to head and are also positioned end to end. The folds (18) supporting the stiffening rods (41) are located at two positions on the body (4). Namely, the two folds (18) are positioned at the junctures on the animal images (7) of the deer's heads (13).

The tails (5) are three-dimensional and provide a life-like appearance to the body (4). Each of the animal images (7) on the body (4) has a tail (5) attached to the interior side (8) and another tail (5) attached to the exterior side (9). On the body's animal images (7), the heads (13) are held in a downward position to look as if the deer are relaxed and grazing. Although this is the preferred animal image of the body, other images of the deer suitably positioned could be used as well.

The photo images on the surfaces of the interior sides (8) are shaded darker than the photo images on the surfaces of the exterior sides (9). Such a contrast in shading lends more accuracy to the visual character of the hunting decoy (1) when seen from a distance. This visual accuracy can serve as an attractive lure to passing deer. In addition, the tails (5) are disposed in a location coincident with the rear (15) of each animal image (7) on the decoy image element (2).

Regarding the means for retaining the arms in position on the stanchion shown in FIG. 6, the elastic retaining cords (40a,40b,40c) are disposed within the respective support arms (22a,22b,22c) and the arm supporting collar (28). Each of the retaining cords (40a,40b,40c) extends through a pair of respective support arms (22a,22b,22c), respective arm fittings (31a,31b,31c), respective tube apertures (30a,30b,30c) and the central tube (29) of the arm supporting collar (28). Additionally, each of the elastic retaining cords (40a,40b, 40c) has two ends; one end being attached to a distal end of one of the pairs of respective support arms (22a,22b,22c) in which the particular retaining cord (40a,40b,40c) is disposed and the other end being attached to a distal end of the other of the pair of respective support arms (22a,22b,22c) in which the cord (40) is disposed.

When the hunting decoy (1) is deployed in the in-use configuration, the peripheral stabilizing supports (20) are primarily located outside of the centralized open area (11) of the body (4). The stiffening rods (41) are positioned within the folds (18) and adjacent to the body (4). Each of the stabilizing cords (42) has one end secured to an approximate midpoint of a respective stiffening rod (41) and the other end secured to a stake (43). During installation, the stabilizing cord (42) is pulled taut against the stiffening rod (41) and the stake (43) is then driven into the ground. This arrangement holds the body (4) in an upright position with the interior (8) and exterior (9) sides of the continuous loop expanded and the centralized open area (11) established.

Figure 11:
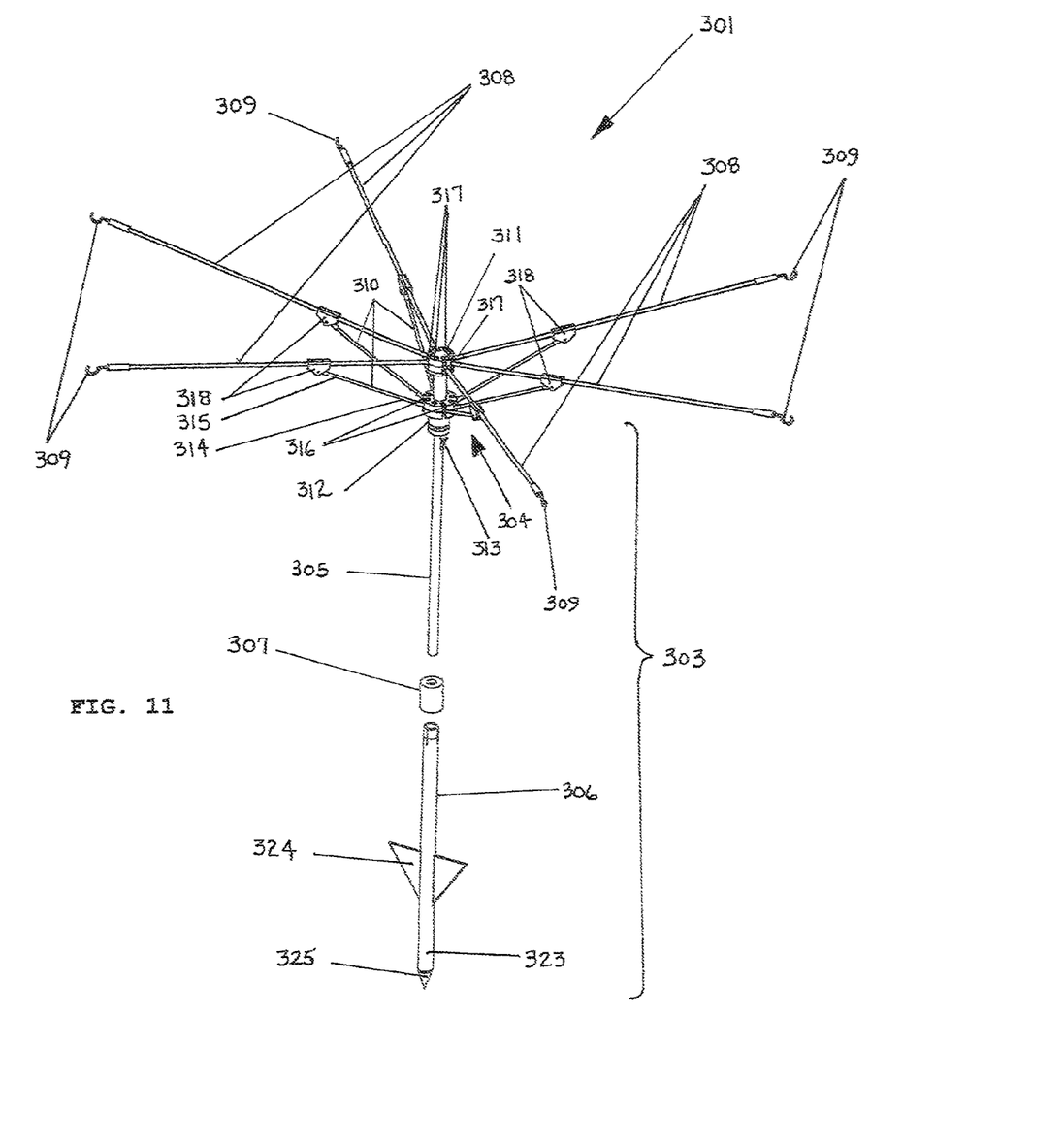
FIG. 11 is a perspective view of a second embodiment of the central suspension support of a preferred embodiment of the hunting decoy of the present invention deployed in the extended position.
Figure 12:
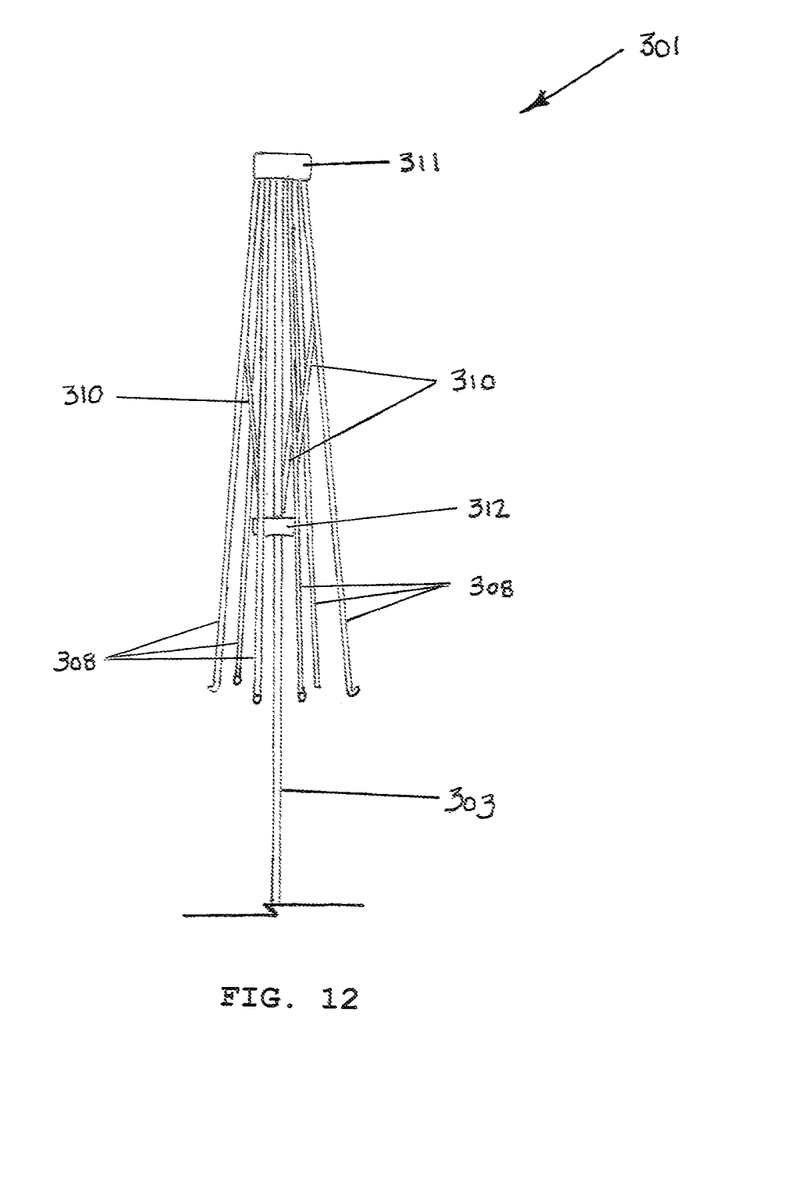
FIG. 12 is a partial view of the second embodiment of the central suspension support of the hunting decoy in FIG. 11 in the collapsed position.

Referring to FIGS. 11 and 12, a second embodiment of the central suspension support (301) of the primary supporting means of the support system of the hunting decoy comprises a stanchion (303), a plurality of support arms (308) and means for extending and collapsing the support arms.

The stanchion (303) is comprised by a plurality of telescoping members (305,306) and means for locking the elongated members in adjustable positions. The telescoping members of the second embodiment are similar to those of the first embodiment including an upper elongated member (305) and a lower elongated member (306). The lower elongated member (306) has a ground engaging portion (323) and an insertion device (324). The ground engaging portion (323) further includes a pointed tip (325). The insertion device (324) is a foot pedal. In addition, the means for locking the telescoping members in adjustable positions is a lock collar (307).

The plurality of support arms (308) is characterized by distal and proximal ends. A body engaging means comprising a swivel hook (309) is disposed on a distal end of each support arm (308). The swivel hooks (309) support the body (4) on the support arms (308) of the central suspension support (301).

The means for extending and collapsing the support arms is an actuator system (304) that includes a plurality of struts (310), a fixed collar (311), a sliding sleeve (312) and a sleeve locking device (313). Each of the struts (310) has first (314) and second (315) ends.

The collar (311) is mounted at the top of the stanchion (303) while the sliding sleeve (312) is mounted along the length of the stanchion (303). The first end (314) of each strut (310) is rotatably secured to the sliding sleeve (312) by a respective first pivotal connector (316). The proximal end of each support arm is rotatably attached to the collar (311) by a second pivotal connector (317). The second end (315) of each strut (310) is rotatably secured to a midpoint on a respective support arm (308) by a third pivotal connector (318).

The sleeve locking device (313) is a conventional spring-loaded detent. The detent retracts into the stanchion (303) as the sliding sleeve (312) is slid upwardly over the locking device (313). After the sliding sleeve (312) passes over the sleeve locking device (313), the detent snaps outwardly from the stanchion (303) to lock the sliding sleeve (312) against downward movement on the stanchion (303). To lower the sliding sleeve (312), the detent is depressed into the stanchion (303) and the sliding sleeve (312) is allowed to move downwardly over the sleeve locking device (313). While a spring-loaded detent is preferred, other suitable locking devices such as a friction locking collar could be used instead.

The second embodiment of the central suspension support (301) includes a collapsed position and an extended position. In the collapsed position, the sliding sleeve (312) is positioned at a lowest point along the stanchion (303) and the support arms (308) and struts (310) are disposed generally alongside the stanchion (303). In the extended position, the sliding sleeve (312) is positioned at a point above the sleeve locking device (313) on the stanchion (303). The sleeve locking device (313) is adjacent to a lower side of the sliding sleeve (312) and holds the sleeve (312) against downward movement on the stanchion (303). In addition, the support arms (308) and struts (310) extend radially outward from the stanchion (303).

When the hunting decoy (1) is in the in-use configuration, the support arms (308) of the second embodiment are in the extended position, the decoy image element (2) is attached thereto, and the peripheral stabilizing supports (20) are deployed. When the hunting decoy (1) is in the storage configuration, the support arms (308) are in the collapsed position, the decoy image element (2) is detached from the central suspension support (301) and the peripheral stabilizing supports (20) are not deployed.

In a preferred use for the hunting decoy (1), decoy image element (2) and support system (3) are removed from the carrying pouch (50) and deployed into the in-use configuration. The stanchion (21) is set into the ground by positioning the pointed tip (35) of the lower telescoping section (26) in the desired location and pressing on the insertion device (36). The downward pressure on the device (36) forces the pointed tip (35) into the ground to thereby hold the stanchion (21) in an upright position.

When utilizing the first embodiment of the central suspension support (19) of the support system (3), each support arm (22a,22b,22c) is engaged with a respective arm fitting (31a, 31b,31c) so that the support arms (22a,22b,22c) extend radially outward from the stanchion (21). With the support arms (22a,22b,22c) attached to the arm fittings (31a,31b,31c), the elastic retaining cords (40) are in tension and help to hold the support arms (22a,22b,22c) onto their fittings (31a,31b,31c).

When utilizing the second embodiment of the central suspension support (301) of the support system, the support arms (308) are raised into the extended position by moving the sliding sleeve (312) upwardly along the stanchion (303). As the sliding sleeve (312) moves upwardly, the struts (310) are activated to push the support arms (308) upwardly and radially outward from the collar (311). Once the support arms (308) are in a fully extended position as shown in FIG. 11, the locking detent engages with the sliding sleeve (312) to lock the sleeve (312) in place on the stanchion (303), thereby holding the support arms (308) in the extended position.

Regarding both the first and second embodiments (19,301) of the central suspension support, with the support arms (22, 308) deployed in the extended position and the stanchion (21,303) installed in the ground, the decoy image element (2) is then attached to the particular central suspension support (19,301) by securing each of the first apertures (16) to a respective swivel hook (38,309) located on the distal end of a respective support arm (22,308). Once the first apertures (16) are mounted on the appropriate swivel hooks (38,309) the decoy image element (2) can be adjusted to a selected height by adjusting the stanchion's length. To adjust the height of the decoy image element (2), the lock collar (33,307) on the stanchion (21,303) is loosened and the upper elongated member (25,305) is moved to the desired height. Once the desired height is attained, the lock collar (33,307) is tightened, thereby locking the elongated members (25,26;305,306) in the selected position.

Alternatively, the height of the stanchion (21,203) can be adjusted before extending the support arms (22,308) into the extended position or installing the decoy image element (2) thereon.

Finally, the peripheral stabilizing supports (20) are engaged. One of the stabilizing cords (42) which is attached to a respective stiffening rod (41) and to a respective stake (43) is pulled taut and then the stake (43) is driven into the ground. The remaining peripheral stabilizing support (20) is subsequently installed using the same steps of pulling the stabilizing cord (42) taut and driving the stake (43) into the ground. As the respective stabilizing cords (42) are pulled taut, the decoy image element (2) is also pulled taut via the stiffening rods (41).

Alternatively, the support arms can be moved into their extended position before the stanchion (21) is inserted into the ground.

To change the hunting decoy (1) from the in-use configuration into the storage configuration, a generally reverse procedure is followed. Initially, the peripheral stabilizing supports (20) are disengaged by removing each of the stakes (43) from the ground, thereby releasing the respective stabilizing cords (42). The decoy image element (2) is then removed from the central suspension support (19,301) by disengaging the first apertures (16) from the respective swivel hooks (38, 309) on the respective support arms (22,308). The central suspension support (19,301) is then disposed into the collapsed position with the arms (22,308) alongside the stanchion (21,303). The lock collar (33,307) is loosened and the upper (25,305) and lower (26,306) elongated members are collapsed into each other. The lock collar (33,307) can be engaged to secure the upper (25,305) and lower (26,306) elongated members against relative sliding movement. The collapsed parts of the support system (3) and the decoy image element (2) can be placed into the carrying pouch (50) for storage and/or transport.

The hunting decoy of the present invention can be easily transported to remote hunting areas and quickly set up for use. The body of the hunting decoy is made of a lightweight material having photo images of animals printed thereon. The photo images comprise a herd of deer grazing which creates a life-like visual image of the animals that attracts deer to the decoy.

It is noted that the hunting decoy described may be adapted for use when hunting animals other than deer by substituting images of the sought after game for the images of the deer.

Although the present invention has been described in considerable detail with reference to certain preferred versions thereof, other versions are possible. Therefore, the spirit and scope of the appended claims should not be limited to the description of the preferred versions contained herein.

The invention claimed is:

1. A hunting decoy comprising:
a decoy image element; and
a support system;
said support system comprises a central suspension support and a plurality of peripheral stabilizing supports for holding the decoy image element;
said hunting decoy comprises an in-use configuration and a collapsed configuration;
wherein said decoy image element comprises a body forming a loop, said body comprising a plurality of images.

2. The hunting decoy of claim 1, wherein said plurality of images comprises photographic images.

3. The hunting decoy of claim 1, wherein said body further comprises an interior side and an exterior side with said decoy image element disposed on said interior and exterior sides.

4. The hunting decoy of claim 3, wherein said body further comprises a simulated animal tail attached to each animal image whereby a first portion of said tail is attached to said interior side and a second portion of said tail is attached to said exterior side.

5. The hunting decoy of claim 3, wherein said body further comprises a foam core disposed between the interior and exterior sides of the body and said interior and exterior sides of the body comprise polyduct material.

6. The hunting decoy of claim 1, wherein, in said in-use configuration, said central suspension support is disposed substantially within the loop formed by the body; and said peripheral stabilizing supports are disposed substantially outside of the loop.

7. The hunting decoy of claim 6, wherein said central suspension support comprises a stanchion, a plurality of support arms and means for extending and collapsing the support arms.

8. The hunting decoy of claim 7, wherein said means for extending and collapsing the support arms comprises:
an arm supporting collar disposed on the stanchion and having a central tube with a plurality of tube apertures in said central tube;
arm fittings extending radially outwardly from the arm supporting collar; wherein said arm fittings are sleeves and each arm fitting is coextensive with a respective tube aperture;
and a plurality of elastic retaining cords, wherein each elastic retaining cord extends through a pair of support arms, a pair of arm fittings and a pair of tube apertures; said elastic retaining cords creating tension to hold the arms on the stanchion;
wherein, in the in-use configuration, each support arm is disposed on a respective arm fitting; and
in the collapsed configuration, each support arm is unattached to the arm fitting and held on the stanchion by the plurality of elastic retaining cords.

9. The hunting decoy of claim 7, wherein said means for extending and collapsing the support arms comprises:
a collar disposed on the stanchion;
a sliding sleeve disposed on the stanchion;
a sleeve locking device to secure the sliding sleeve on the stanchion;
a plurality of struts;
wherein each strut being pivotally attached to said sliding sleeve and to a respective one of said support arms; and each of said support arms further pivotally attached to said collar.

10. The hunting decoy of claim 7, wherein said each of said support arms includes a swivel hook disposed on a distal end thereof; said swivel hook supporting said body when the hunting decoy is disposed in said in-use configuration.

11. The hunting decoy of claim 7, further comprising a carrying pouch for containing said decoy image element and said support system when said hunting decoy is in said collapsed configuration.

12. A hunting decoy comprising:
a collapsible decoy image element; and
a collapsible support system;
said support system comprising a primary supporting means and a secondary supporting means;
said hunting decoy comprising an in-use configuration and a collapsed configuration;

wherein said decoy image element comprises a loop; and
wherein said primary and secondary supporting means support said decoy image element when said hunting decoy is in said in-use configuration and said primary supporting means is substantially disposed within the loop and said secondary supporting means is substantially disposed outside the loop.

13. The hunting decoy of claim 12, wherein said decoy image element comprises means for attaching the decoy image element to the support system; and said primary supporting means includes a plurality of support arms and means for extending and collapsing the support arms.

14. A hunting decoy comprising:
a collapsible decoy image element; and
a collapsible support system;
wherein the decoy image element includes a body and support engaging means;
said body comprises photo images of a plurality of deer and further comprises a loop including said images;
each of the plurality of deer has a plurality of legs, a head, a back and a rear;
wherein said deer images are arranged in a series on the body, whereby two pairs of heads are adjacently disposed and two pairs of rears are adjacently disposed;
said body further comprises an interior side and an exterior side with said decoy image element disposed on said interior and exterior sides;
said support engaging means comprises a plurality of first apertures, and a plurality of second apertures on said body;
wherein the collapsible support system comprises a central suspension support and a plurality of peripheral stabilizing supports;
said central suspension support comprises a stanchion, a plurality of support arms, and means for extending and collapsing the support arms;
said stanchion comprises an upper elongated member and a lower elongated member telescopically engaged, and a lock collar to lock the elongated members in adjustable positions;
said lower elongated member comprises a ground engaging portion having a pointed tip and an insertion device;
wherein said pointed tip is adapted to insert into the ground and the insertion device is adapted to maneuver the ground engaging portion for installation into the ground;
the central suspension support comprises a collapsed position and an extended position;
wherein, in said collapsed position, said plurality of supporting arms extend substantially downwardly alongside the stanchion;
wherein, in said extended position, said support arms extend radially outwardly from the stanchion;
each of the support arms includes a proximal and distal end;
a swivel hook is disposed on the distal end of each respective support arm, wherein said swivel hook pivots with respect to the support arm;
each of the peripheral stabilizing supports comprises a stiffening rod, a stabilizing cord and a stake;
wherein said each of said stiffening rods is disposed on the body; each of said stabilizing cords extends through a respective one of said second apertures on the body and is attached at one end to a respective stiffening rod; and each of said stabilizing cords is attached at another end to a respective stake;
wherein to deploy said peripheral stabilizing supports each of the stabilizing cords is pulled taut and the respective stake is inserted into the ground while maintaining the tautness of the stabilizing cords;
when not deployed, the stakes are removed from the ground and the stabilizing cords are released from being taut;
said hunting decoy further comprising an in-use configuration and a collapsed configuration;
wherein, in said in-use configuration, said stanchion is inserted into the ground by pushing the insertion device and inserting the pointed tip of the ground engaging portion into the ground; the support arms are moved into the extended position to extend outwardly from the stanchion; the decoy image element is attached to the stanchion by attaching the swivel hooks to the first apertures, such that each of the first apertures on the body are secured to a respective swivel hook on the support arms; and said peripheral stabilizing supports are deployed;
wherein, in said in-use configuration, a centralized open area is formed between the interior sides of the body; said central suspension support is disposed substantially within the centralized open area of the body; and said peripheral stabilizing supports are disposed substantially outside of the centralized open area;
wherein, in said collapsed configuration, said decoy image element is detached from said central suspension support; said central suspension support is in said collapsed position with said support arms generally positioned alongside said stanchion; and said peripheral stabilizing supports are not deployed;
wherein, in said collapsed configuration said decoy image element and said collapsible support system can be stored in said carrying pouch.

15. The hunting decoy of claim 12, wherein the means for extending and collapsing the support arms is a releasable arms support;
said releasable arms support comprises an arm supporting collar, a plurality of arm fittings and a plurality of elastic retaining cords;
said arm supporting collar is disposed on said upper elongated member; said arm fittings are generally sleeve-shaped and extend radially outwardly from the arm supporting collar; and each arm fitting is generally aligned with one other arm fitting;
said arm supporting collar comprises a central tube and a plurality of tube apertures;
said tube apertures extend through said central tube and each of said tube apertures is co-extensive with a respective one of said arm fittings;
wherein each of the elastic retaining cords extends through a pair of aligned support arms, a respective pair of aligned arm fittings and a respective pair of tube apertures;
wherein, in said extended position, each of said support arms are attached to a respective arm fitting and the elastic retaining cords are tensioned;
wherein, in said collapsed position, each of said support arms are released from the respective arm fitting; and the support arms are held by the elastic retaining cords and are positioned generally alongside the stanchion.

16. The hunting decoy of claim 12, wherein the means for extending and collapsing the support arms comprises a releasable actuator system;
said releasable actuator system comprises a plurality of struts, a collar, a sliding sleeve and a sleeve locking device;
each of said struts comprises a first end and a second end;

said releasable actuator system further comprising a plurality of first pivotal connectors, a plurality of second pivotal connectors and a plurality of third pivotal connectors;

wherein each of said first ends of a respective strut is pivotally attached to the sliding sleeve by one of said first pivotal connectors; each of the proximal ends of a respective support arm is pivotally attached to the collar by a second pivotal connector; and each of said second ends of a respective strut is pivotally attached to a respective support arm by a respective third pivotal connector;

when said central suspension support is in the extended position, said sliding sleeve is positioned a first distance from said collar, said support arms extend radially outwardly from the collar, and said struts extend radially outwardly from the sliding sleeve;

when said central suspension support is in the collapsed position, said sliding sleeve is positioned a second distance from said collar wherein said second distance is greater than said first distance, said support arms extend generally downwardly alongside said stanchion and said struts extend generally downwardly alongside said stanchion and said support arms.

* * * * *